United States Patent [19]
Oxenreider

[11] 4,351,890
[45] Sep. 28, 1982

[54] BATTERY CASE HAVING A SIDE TERMINAL MOLDED THEREIN

[75] Inventor: Terry Oxenreider, Wernersville, Pa.

[73] Assignee: General Battery Corporation, Reading, Pa.

[21] Appl. No.: 174,126

[22] Filed: Jul. 31, 1980

[51] Int. Cl.³ .................. H01M 2/06; H01M 2/30
[52] U.S. Cl. ............................ 429/179; 429/182
[58] Field of Search ............... 429/179, 178, 182; 339/224, 236 B

[56] References Cited
U.S. PATENT DOCUMENTS
3,632,450 1/1972 Coffey et al. .................. 429/179

3,711,335 1/1973 Daniel .......................... 429/179 X

FOREIGN PATENT DOCUMENTS
463814 4/1974 Australia ......................... 429/179
2216606 10/1972 Fed. Rep. of Germany ...... 429/179

*Primary Examiner*—Anthony Skapars
*Attorney, Agent, or Firm*—Benasutti Associates, Ltd.

[57] ABSTRACT

A side terminal battery container of the type having a side terminal molded therein is disclosed. The side terminal of the present invention does not extend into the interior of the battery container and is particularly useful for resistance welding techniques during the battery manufacturing process.

2 Claims, 4 Drawing Figures

BATTERY CASE HAVING A SIDE TERMINAL MOLDED THEREIN

BACKGROUND OF THE INVENTION

1. Field of the Invention

This invention relates to electric storage batteries having their external terminals in the side or end walls of the battery container. More particularly this invention relates to electric storage batteries primarily for use in starting, lighting, and ignition type applications.

2. Description of the Prior Art

One method of assembling side terminals in a battery case is to provide a terminal which is inserted through an aperture in the case wall and is mated with a retaining ring on the inside of the case wall. In such a method the terminal and inside ring are fused by turning the case on its side and gas burning the terminal and ring together. Connections of this type, however, have a tendency to leak not only because of a deficiency in the mechanical joint itself, but also because the heat generated during the fusing operation, if not properly controlled by the operator, causes distortion of the case surrounding the terminal and further degrades the seal about the terminal connection. One solution in the prior art to the difficulty of sealing this type of terminal has been to provide an additional sealant or gasket, which is applied at the case terminal interface to insure adequate sealing.

A second approach to the manufacturer of side terminal batteries has been to cast a terminal in place within an aperture which has been formed in a battery case. This method has achieved some success, however, the difficulty with this cast in place method is that the manufacturing variables are critical and therefore the tooling and apparatus used must be controlled within very close limits. Additionally, the apparatus required for such manufacturing technique is Capital Intensive. While this technique has provided a terminal which has a better seal, it does tend to result in a reduced rate of production which may counter balance the advantages of the better seal.

Both of the prior art methods of producing a terminal in the side or end wall of the battery case share a common defect which is that there is a protrusion or an encroachment of the lead terminal into the battery container. This is necessary to affect sealing between the terminal and the inside wall of the battery container. This protrusion into the cell or cavity of the battery container results in slowed production and also in production damage if the technician assembling the battery is not careful while placing the cell element in the cell cavity.

OBJECTS OF THE INVENTION

It is an object of the present invention to provide a side terminal battery case having an improved seal between the terminal and the case.

It is an object of the invention to provide a side terminal for use in a molded side terminal battery case which will permit the use of resistance welding in connecting the battery element plate strap to the side terminal.

SUMMARY OF THE INVENTION

A battery container having a terminal molded in a side wall thereof for providing electrical connection. Said terminal having a unitary body with circumferencial rings, a first face extending beyond the exterior surface of the side wall of the battery container and a second face which does not break the plane defined by the interior surface of the side wall.

DETAILED DESCRIPTION OF THE PREFERRED EMBODIMENTS

Referring now in detail to the attached drawings, wherein like numbers indicate similar features, the invention will be described in detail.

Figure 1:
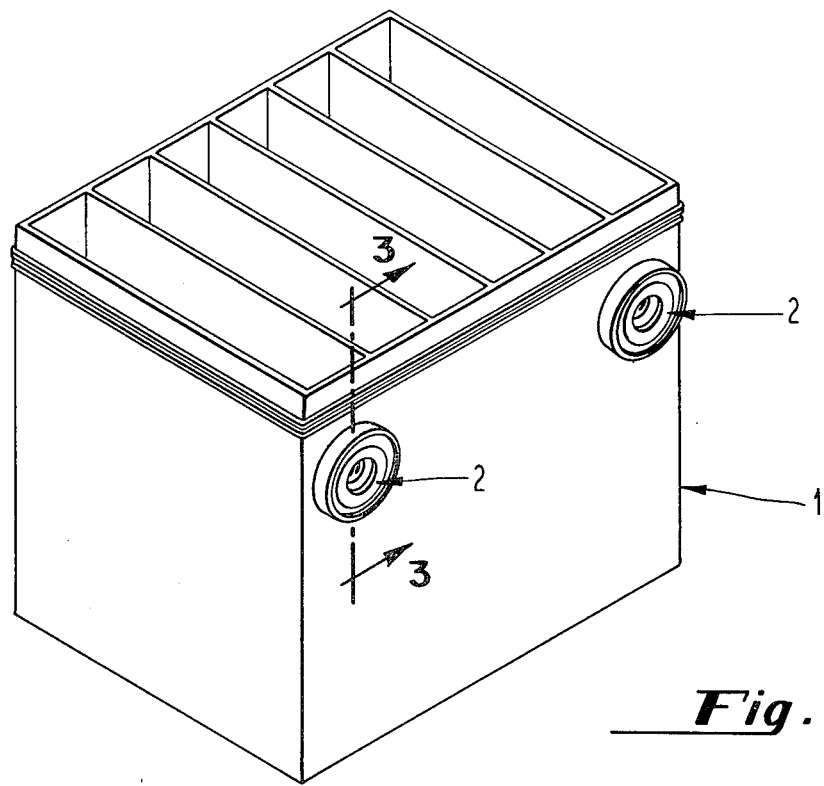
FIG. 1 is a perspective view of a battery container having the inventive side terminal therein.

Referring now to FIG. 1, there is shown a typical six cell, twelve volts side terminal container 1, with side terminal 2 molded therein. The form of battery container 1 will be well known to those skilled in the art and requires no further explanation here.

Figure 2:
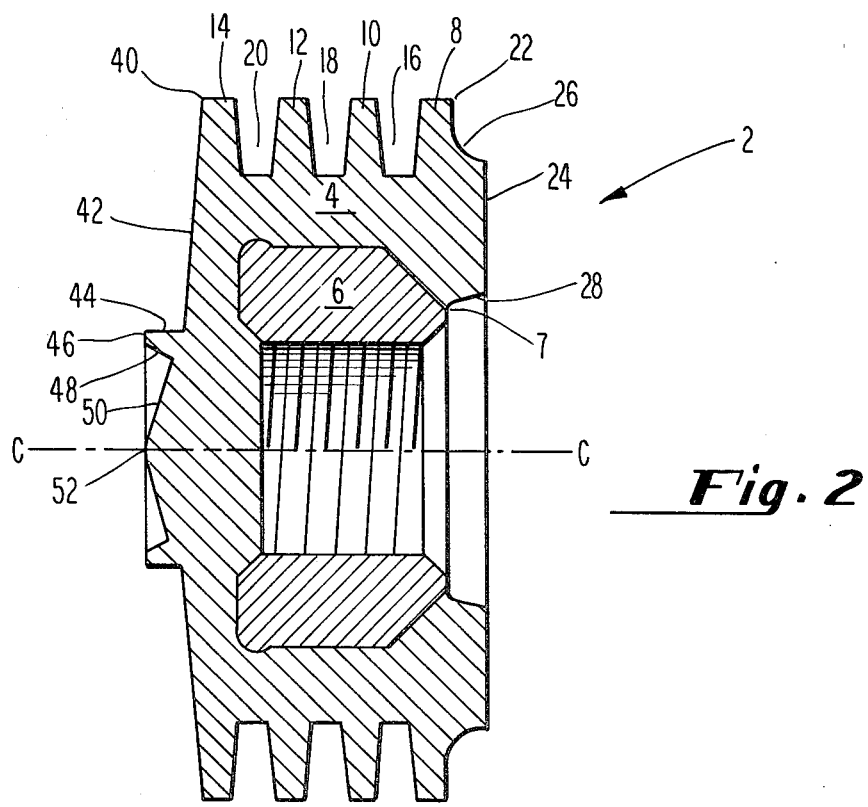
FIG. 2 is a sectional view through a side terminal according to the invention prior to molding the battery container.

Referring now to FIG. 2, there is shown the terminal prior to molding in the battery case. The terminal 2 has a lead body 4, and a stainless steel insert 6, both of which will be known to those in the art. The terminal 2 is symetric about the centerline c—c. Extending around the exterior surface of the terminal 4 there are a plurality of angular rings 8, 10, 12 and 14 which define the voids 16, 18 and 20. The purpose of angular rings 8 through 14 and voids 16 through 20 is to provide a space for the thermal plastic material of the battery case to interlock with the terminal and form a positive lock. This prevents the terminal 2 from withdrawing from the battery case. While four angular rings are shown in the preferred embodiment, it will be obvious that the number of angular rings may be varied according to the depth of the terminal desired and the threading surfaces provided on the insert 6. A radius 26 is formed between the forward edge 22, of ring 8, and the forward surface 24 of the terminal. Likewise it can be seen that between the lead edge 7 of the insert 6, and the forward surface 24 there is formed a radius of 28. The radii 26 and 28 of the instant terminal when molded in the battery case appears as the front surface of any of the known side terminals.

The rear surface 42 of the terminal 2 angles outwardly from the trailing edge 40 of ring 14 to the plateau 44. Plateau 44 extends rearward for approximately the same distance as one of the angular rings. A short vertical face can be seen on collar 46. Collar 46 surrounds the node 50 and the face thereof between the outward edge of plateau 44 and inwardly tapered surface 48. The inwardly tapered surface 48 extends to the base of a conical node 50. As can be seen the conical node 50 terminates in a tip 52. The tip 52, in the preferred embodiment, is recessed slightly from the plane of collar 46 which provides a crush sleeve surrounding the conical node 50. The purpose of having collar 46 form a crush sleeve, is to enable the core in the injection molding process, used for forming the battery cases, to come into a firm contact with the collar 46 and through the pressure exerted on the core to collapse the ring slightly and thereby assure a good seal between the terminal 2 and the core of the molding apparatus. In this way the resulting seal will prevent the thermal plastic material of which the container is formed from bleeding into the node area of the terminal. However, it will be appreciated that the collar 46 and the node tip 52 may be co-planar.

Figure 3:
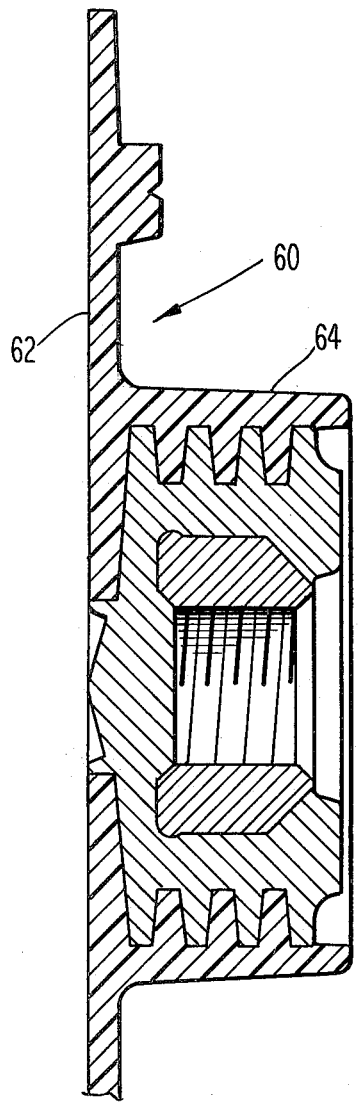
FIG. 3 is a section through 3—3 of FIG. 1 showing a side terminal molded in a battery container.

Referring now to FIG. 3, there is shown a battery terminal 2 in a molded condition in a battery container 60. Note that the inner wall 62 of the battery container lies within a single plane and that the tip 52 of node 50 is substantially equal with the plane defined by the inner wall 62. The thermal plastic material which makes up the battery container 60 and forms the collar 64 has fully filled the voids 16, 18 and 20 which are formed between the angular rings 8 through 14. It is this formation of the thermal plastic in the collar 64 which secures the terminal against being withdrawn or pulled from the battery container during fastening of an external electrical lead to the terminal via insert 6. Also note that the material which has been formed behind rear surface 42 prevents the pulling or movement of the terminal 2, into the battery case during the final assembly stages. It should be noted at this time, that while the collar 64 appears to be somewhat larger than those normally seen on a side terminal battery, this is only a result of the design used for the preferred embodiment. If it should become critical to maintain identical outward appearances, it would be possible to use an insert which is narrower and therefore reduce the number of angular rings and bring the dimensions of the collar more in line with those normally seen.

Figure 4:
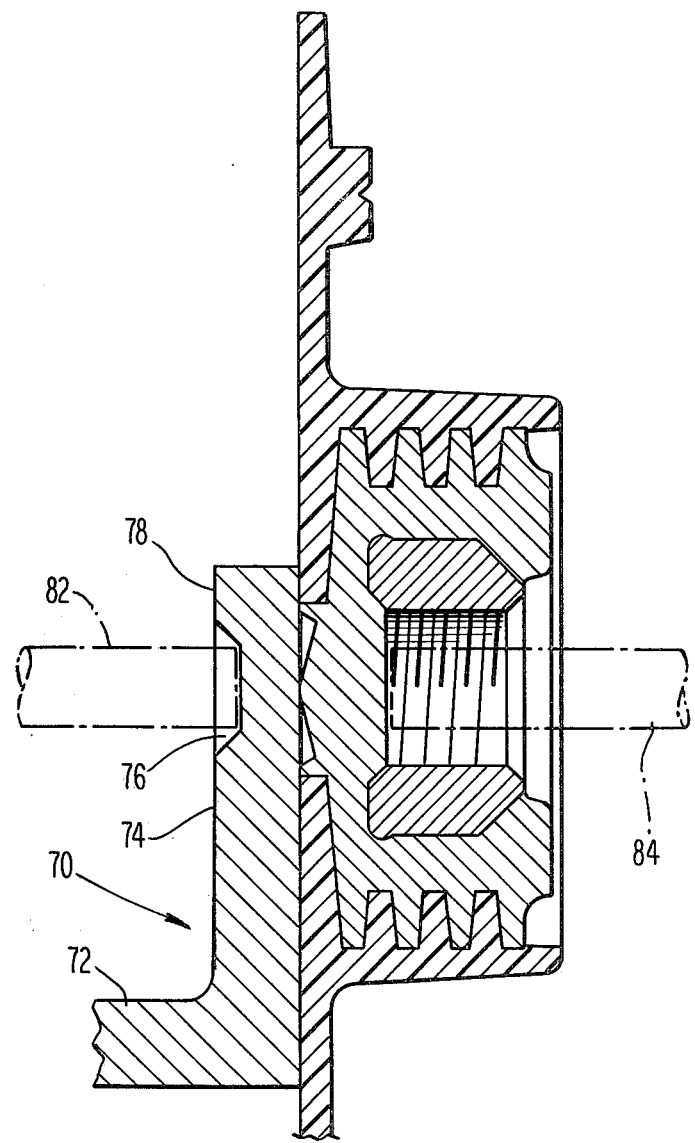
FIG. 4 is a sectional view illustrating the relationship between a side terminal, according to the invention, and a plate strap from the battery elements.

Turning now to FIG. 4, there is shown a typical interconnection between the terminal 2 and the upstanding lug of the plate strap. The plate strap 70 has a lower portion 72 which is cast on or suitably welded to the lugs of the battery plates comprising the element to be placed in the cell. An upstanding lug 74 is provided for interconnecting the element to the terminal 2. The lug 74 is an upstanding lug of lead, as is generally known in the art, which has been modified to have a recess 76, which is positioned to oppose the conical node 50 of the terminal 2. As an advantage of the present invention, the lug 74 may be made of a reduced amount of lead as was generally used for similar lugs which had to be gas burned. The present lug is particularly designed to make efficient use of electrode resistance welding. Thus, as the tolerances for casting and joining the lugs 74 become more controllable, it becomes possible to reduce the upward extending portion 78 and to make the lug 74 smaller. This reduction is possible because of the increased controllability which electrode welding provides and because the method of welding provides for more controllable heat.

In the actual welding operation electrode tips 82 and 84, shown in phantom in FIG. 4, are brought into contact with the recess 76 of the upstanding lug 74 and the forward surface 54 of node 50. As the current is applied to the electrode tips 82 and 84 there is an area of high resistance at the inner face of tip 52 and lug 74. As a result of resistance and increased temperature the metal will become softened as is known in the art. The electrodes 82 and 84 will continue toward each other. When sufficient material has been joined the power to the tips 82 and 84 will be turned off and the tips will be held momentarily to insure that the weld solidifies before the electrodes are removed.

It will be recognized, by those skilled in the art, that, if desired, lug 74 may be casted without the recess 76 therein, in which case the welding electrode would form the recess during the squeeze portion of the welding operation. Likewise, if so desired, the electrode 84 may be a simple flat face electrode which contacts the forward surface 24. Surface 24, being of lead and conductive, will pass the current.

As is known in the art, terminal 4 is generally provided with an anti-rotation lock feature. In the instant invention, the anti-rotation lock may take the form of perpendicular slots cut around the circumference of the angular rings, to permit plastic flow therein or may be projections or depressions formed with or within the base of the voids to interrupt the smooth circumference thereof.

Having fully disclosed my invention, it is realized that variations thereon may be made without departing from the spirit of my invention or the scope of the claims amended hereto.

I claim:

1. A battery container with a terminal for making the terminal electrical connection with an end element of the battery associated with an upstanding portion of a battery strap through the side wall of the battery container, said battery container side wall having an exterior surface and an interior surface and said terminal molded therein, said terminal comprising;

a unitary body having circumferential lock means wherein said unitary body has a forward face associated with said exterior surface and a rearward portion associated with said interior surface for completing the electrical connection with said end element adjacent to said interior surface;

said rearward portion further comprising a border portion substantially co-planar with said interior surface and a node portion, said node portion further comprising a base recessed from said interior surface and a conical portion extending from said base, and said conical portion extending from said base to a plane substantially co-planar with said interior surface;

whereby the upstanding portion of the battery strap associated with said end element is placed against said interior surface and said upstanding portion is welded to said rearward portion.

2. the invention of claim 1 wherein:

said unitary body further comprises anti-rotation means thereon.

* * * * *